(12) United States Patent
Mustafi et al.

(10) Patent No.: US 11,715,290 B2
(45) Date of Patent: *Aug. 1, 2023

(54) MACHINE LEARNING BASED MODELS FOR OBJECT RECOGNITION (71) Applicant: salesforce.com, inc., San Francisco, CA (US)

(72) Inventors: Joy Mustafi, Telangana (IN); Lakshya Kumar, Telangana (IN); Rajdeep Dua, Telangana (IN); Machiraju Pakasasana Rama Rao, Hyderabad (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/558,416

(22) Filed: Dec. 21, 2021

(65) Prior Publication Data
US 2022/0114394 A1 Apr. 14, 2022

Related U.S. Application Data (63) Continuation of application No. 16/751,078, filed on Jan. 23, 2020, now Pat. No. 11,210,562.

(30) Foreign Application Priority Data

Nov. 19, 2019 (IN) .............................. 201941047069

(51) Int. Cl.
*G06V 10/82* (2022.01)
*G06V 20/30* (2022.01)
(Continued)

(52) U.S. Cl.
CPC ............ *G06V 10/82* (2022.01); *G06F 18/217* (2023.01); *G06F 18/2148* (2023.01);
(Continued)

(58) Field of Classification Search
CPC ...................................................... G06V 20/30
See application file for complete search history.

(56) References Cited

U.S. PATENT DOCUMENTS 11,210,562 B2 * 12/2021 Mustafi ................ G06V 10/806
2014/0044305 A1    2/2014 Scavezze et al.
(Continued)

OTHER PUBLICATIONS einstein.ai, "Salesforce Research: Flagship deep learning research and engineering for the world's smartest CRM," Date Unknown, eight pages, [Online] [Retrieved on Mar. 12, 2020] Retrieved from the Internet <URL: https://einstein.ai/>.
(Continued)

*Primary Examiner* — Edward Park
(74) *Attorney, Agent, or Firm* — Fenwick & West LLP (57) ABSTRACT Machine learning based models recognize objects in images. Specific features of the object are extracted from the image using machine learning based models. The specific features extracted from the image assist deep learning based models in identifying subtypes of a type of object. The system recognizes the objects and collections of objects and determines whether the arrangement of objects violates any predetermined policies. For example, a policy may specify relative positions of different types of objects, height above ground at which certain types of objects are placed, or an expected number of certain types of objects in a collection.

20 Claims, 7 Drawing Sheets (51) Int. Cl.
     *G06F 18/214*   (2023.01)
     *G06F 18/21*    (2023.01)
     *G06F 18/24*    (2023.01)
     *G06V 30/18*    (2022.01)
     *G06V 30/19*    (2022.01)
     *G06V 10/80*    (2022.01)
     *G06V 30/10*    (2022.01)

(52) U.S. Cl.
     CPC ...... *G06F 18/24765* (2023.01); *G06V 10/806* (2022.01); *G06V 20/30* (2022.01); *G06V 30/18057* (2022.01); *G06V 30/19173* (2022.01); *G06V 30/10* (2022.01); *G06V 2201/09* (2022.01)

(56) References Cited

U.S. PATENT DOCUMENTS

| | | |
|---|---|---|
| 2014/0241623 A1 | 8/2014 | Wang et al. |
| 2017/0068840 A1 | 3/2017 | Chaki et al. |
| 2018/0373961 A1 | 12/2018 | Wang et al. |
| 2020/0090007 A1 | 3/2020 | Joseph et al. |
| 2020/0160050 A1 | 5/2020 | Bhotika et al. |
| 2020/0402139 A1* | 12/2020 | Higa ................... G07G 1/0036 |
| 2021/0004584 A1 | 1/2021 | Bildner et al. |

OTHER PUBLICATIONS

Logograb, "Detect logos and marks at scale in images and videos," Date Unknown, five pages, [Online] [Retrieved on Mar. 12, 2020] Retrieved from the Internet <URL: https://www.logograb.com/>.

Rosebrock, A., "OpenCV OCR and text recognition with Tesseract," Sep. 17, 2018, 26 pages, [Online] [Retrieved on Mar. 12, 2020] Retrieved from the Internet <URL: https://www.pyimagesearch.com/2018/09/17/opencv-ocr-and-text-recognition-with-tesseract/>.

Wikipedia, "Optical character recognition," Created Apr. 14, 2002, Last Edited Feb. 26, 2020, 11 pages, [Online] [Retrieved on Mar. 12, 2020] Retrieved from the Internet <URL: https://en.wikipedia.org/wiki/Optical_character_recognition>.

U.S. Appl. No. 16/751,078, filed May 12, 2021, 15 pages.

* cited by examiner

MACHINE LEARNING BASED MODELS FOR OBJECT RECOGNITION

CROSS REFERENCE TO RELATED APPLICATION

This is a continuation of U.S. application Ser. No. 16/751,075, filed Jan. 23, 2020, which claims the benefit of Indian Provisional Application No. 201941047069, filed Nov. 19, 2019, which is incorporated by reference in its entirety.

BACKGROUND

Field of Art

This disclosure relates in general to machine learning based models, and in particular to machine learning based models for recognizing objects in images.

Description of the Related Art

Machine learning techniques such as neural networks are used for recognizing objects in images. These techniques train machine learning based models using images of known objects. The trained machine learning base models distinguish between different types of objects displayed in images. For example, neural networks can recognize whether an image shows a cat or a dog.

Certain types of objects have several subtypes that have subtle differences. For example, different models of a mobile phone by a manufacturer may look very similar. For example, images of different models of a mobile device look very similar. Existing models often fail to distinguish between different visually similar subtypes of a type of object. For example, a machine learning based model may be able to recognize that an image displays a mobile phone. However, such models often fail to accurately identify the make and model of the mobile device displayed in the image. This is so because different models of a mobile device have very subtle differences and existing machine learning based models result in false positives while attempting to distinguish between such models.

The figures depict various embodiments for purposes of illustration only. One skilled in the art will readily recognize from the following discussion that alternative embodiments of the structures and methods illustrated herein may be employed without departing from the principles of the embodiments described herein.

The figures use like reference numerals to identify like elements. A letter after a reference numeral, such as "115a," indicates that the text refers specifically to the element having that particular reference numeral. A reference numeral in the text without a following letter, such as "115," refers to any or all of the elements in the figures bearing that reference numeral.

DETAILED DESCRIPTION

Embodiments of the invention recognize objects in images. A system uses machine learning based models to extract specific features from an image. These features help distinguish between different subtypes of a particular type of object. The extracted features are provided as input to another model configured to recognize objects. These specific features extracted from the image assist deep learning based models in identifying subtypes of a type of object. The techniques disclosed allow the system to distinguish between subtypes of objects that have very similar features, for example, different models of mobile phones offered by the same manufacturer. The techniques can also be used to analyze collections of objects for example, images of shelves of a physical store with stacks of devices or other objects. The system recognizes the objects and collections of objects displayed on the shelves and can be used to determine whether the arrangement of objects violates any policies. For example, a policy may specify relative positions of different types of objects, height above ground at which certain types of objects are placed, number of certain types of objects that should be available on a shelf, and so on.

In an embodiment, the system receives an image displaying one or more collections of physical objects such as a shelf with objects of different types. The image may further display information describing collections of physical objects, for example, labels displayed on shelves identifying the type of product expected to be placed on that portion of the shelf, price of the product placed and so on.

The system accesses multiple machine learning based models, each model configured to extract a feature of the image. The system executes some machine learning based models to determine coordinates of bounding boxes within the image. Each bounding box identifies a visual feature of the image, for example, an externally visible component or certain type of text.

The system processes the portion of the image within the bounding box to extract a feature. For example, the bounding box may display a logo and the system executes a machine learning based model to classify the logo. The bounding box may display certain text and the system perform optical character recognition (OCR) to identify the text. The system may further analyze the text to recognize entities identified by the text, for example, names, currency values, dates, and so on. The system provides the extracted features to an object recognition model to recognize the objects within the image.

In some embodiments, the object recognition model is configured to predict a property of collections of physical objects displayed in the image. For example, the object recognition model may determine a count of the objects of a particular type on the shelf. The object recognition model may determine relative positions of certain types of objects.

The user of specific features to assist in object recognition results in higher accuracy of results predicted. Furthermore, the training of models is simplified. For example, a deep learning model that simply receives an image and predicts the type of object may require lot more training than the models disclosed herein. As a result, the techniques improve the process of training of the models by making the process efficient. Furthermore, any neural networks used for object recognition are also simplified. For example, the neural networks may have fewer layers. As a result, execution of the neural networks based on disclosed techniques is efficient compared to conventional neural networks used for achieving similar tasks.

The object recognition model may determine whether the objects conform to certain policies. The system performs certain actions based on the output of the object recognition model. For example, the system may generate a report for displaying to a user. The system may send an alert representing a message to a user if certain objects are determined to violate a policy.

System Environment

Figure 1:
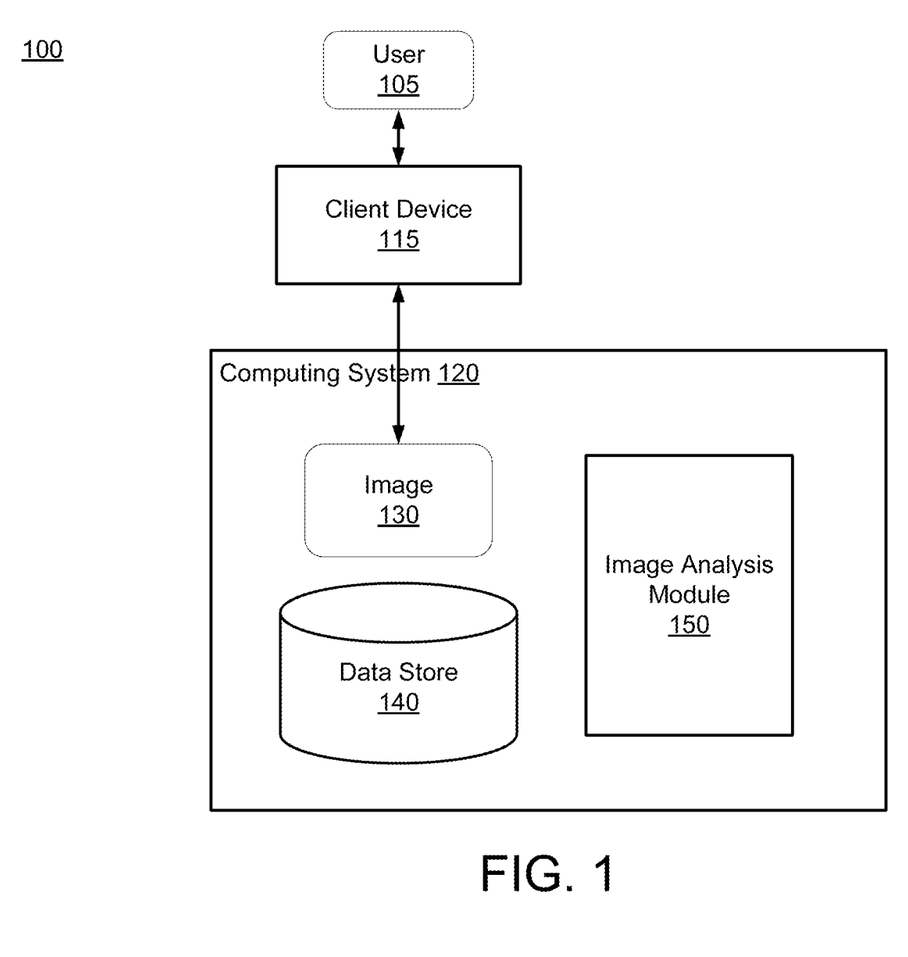
FIG. 1 is a block diagram of a system environment for performing analysis of images, according to one embodiment.

FIG. 1 is a block diagram of a system environment for performing analysis of images, according to one embodiment. The system environment 100 includes a computing system 120 that communicates with users 105 via client devices 115. The computing system includes 120 a data store 140 and an image analysis module 150. The computing system 120 may include other components not shown in FIG. 1, for example, various applications, other types of data stores, and so on. The system environment 100 may include other elements not shown in FIG. 1, for example, a network.

The computing system 120 receives images 130. The images may be provided by a user 105 via a client device 115. The images may be stored in the data store 140. The image analysis module 150 analyzes images 130 using processes and techniques disclosed herein. The image analysis module 150 recognizes objects in the images and properties of objects displayed in the images.

The data store 140 stores data for users of the computing system 120. The data store 140 may be implemented as a relational database storing one or more tables. Each table contains one or more data categories logically arranged as columns or fields. Each row or record of a table contains an instance of data for each category defined by the fields. For example, a data store 140 may include a table that describes a user with fields for basic contact information such as name, address, phone number, fax number, etc. Another table might describe an organization, including fields for information such as name, address, size of organization, etc.

In some embodiments, the computing system 120 is a multi-tenant system that stores data of multiple tenants. Each tenant may be an enterprise. For example, a tenant may be a company that uses the multi-tenant system to manage their processes. A multi-tenant system may store data for multiple tenants in the same physical database but enforce a logical separation of data across tenants. As a result, one tenant does not have access to another tenant's data, unless such data is expressly shared.

In an embodiment, computing system 120 implements a web-based customer relationship management (CRM) system. For example, the computing system 120 may include application servers configured to implement and execute CRM software applications as well as provide related data, code, forms, webpages and other information to and from client devices 115 and to store to, and retrieve from, a database system related data, objects, and webpage content.

The computing system 120 and client devices 115 shown in FIG. 1 represent computing devices. A computing device can be a conventional computer system executing, for example, a Microsoft™ Windows™-compatible operating system (OS), Apple™ OS X, and/or a Linux OS. A computing device can also be a device such as a personal digital assistant (PDA), mobile telephone, video game system, etc.

The client devices 115 may interact with the computing system 120 via a network (not shown in FIG. 1). The network uses a networking protocol such as the transmission control protocol/Internet protocol (TCP/IP), the user datagram protocol (UDP), internet control message protocol (ICMP), etc. The data exchanged over the network can be represented using technologies and/or formats including the hypertext markup language (HTML), the extensible markup language (XML), etc.

System Architecture

Figure 2:
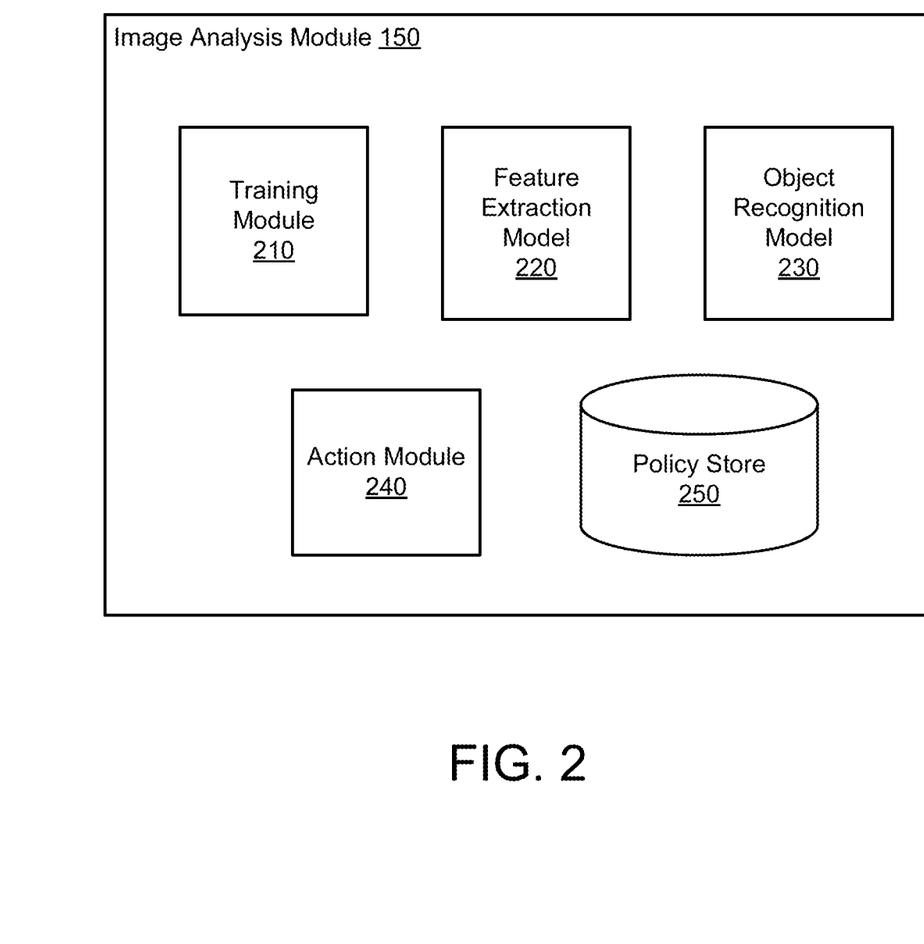
FIG. 2 is a block diagram illustrating components of the image analysis module, according to one embodiment.

FIG. 2 is a block diagram illustrating components of the image analysis module, according to one embodiment. The image analysis module 150 comprises a training module 210, one or more feature extraction models 220, one or more object recognition models 230, an action module 240, and a policy store 250. Other embodiments can have different and/or other components than the ones described here, and that the functionalities can be distributed among the components in a different manner.

The image analysis module 150 uses machine learning based models for performing image analysis including the feature extraction models 220 and the object recognition models 230. The feature extraction models 220 are configured to receive an input image that displays one or more objects and predict a specific feature of the image. As an example, a feature represents a type of logo present on an object displayed in the image. As another example, a feature represents certain text displayed on the object in the image, for example, text identifying the manufacturer or model of a device.

Other examples of features include the position of the logo or text within the object in the image. For example, the position of a logo may be in the center of a device for certain model of a device but may be closer to a side in another model of that type of device. The object recognition model 230 receives a plurality of features extracted by the feature extraction models 220 and determines scores used to predicting the type of object displayed in the image or certain property of the objects displayed in the image.

The training module 210 performs training of the machine learning based models used by the image analysis module 150 including the feature extraction models 220 and the object recognition models 230. The training module 210 stores training data set, for example labeled data set for training the machine learning based models.

The policy store 250 stores policies comprising rules that apply to objects displayed in images. For example, the image may show shelves in a physical store or in a warehouse. Each shelf may store objects of different types or different portions of a shelf may store objects of different types. A collection of a type of objects is typically stored together in a portion of the shelf. A policy may specify the number of objects of a particular type that should be present on the shelf or in a portion of the shelf, the relative positions of the objects, a height at which the object should be placed on the shelf, and so on.

In an embodiment, the system identifies features using feature identifiers and a policy is represented as a constraint based on features. For example, a feature f1 represents a height above ground for an object and a policy is represented by a constraint $f1<=N$, where N is a value. This policy is violated whenever value of f1 exceeds N. Similarly, the size of a collection of an object of a particular type is represented by a feature f1 and a policy represents the constraint $f2>=M$. This policy is violated whenever the number of instances of that particular object in a collection falls below M. For example, this situation may indicate that the inventory of that type of object is low.

As another example, a policy may specify that mobile phones of a given manufacturer should be placed together on a shelf and different models of the mobile phone should be placed in a particular order, for example, in increasing order of model number. Another policy may specify that most popular devices are placed on a shelf that is at eye level for a person of average height whereas less popular devices are placed close to the bottom shelf or top shelf that is less reachable to a person of average height.

The image analysis module 150 may use the models 220 and 230 to recognize types of objects displayed in an image and determine the number of each type of object. For example, the image may display a type of electronic device such as a mobile phone, a laptop, a printer, and so on and the image analysis module 150 determines the type of object (e.g., mobile device, printer, laptop) and a make and model of the object (e.g., iPhone 6, iPhone 6s, iPhone 7, iPhone 8, and so on).

The image analysis module 150 may receive an image of several collections of different types of objects. For example, the image may display shelves in a physical store, each shelf storing objects of different types. The shelf may include labels of types of objects that are expected to be displayed in a portion, the prices of the objects, and so on. The image analysis module 150 recognizes the types of objects displayed openly or within packages. The image analysis module 150 further analyzes the objects to determine whether they comply with any applicable policies. For example, the image analysis module 150 may determine the number of a particular type of object detected in the image of the shelf and determine whether the number is above a threshold specified by a policy. The image analysis module 150 may determine the relative positions of different types of objects and determine whether the relative positions comply with any applicable policies.

In a multi-tenant system, the policy store 250 may store policies for different tenants. Some of the machine learning based models are global models that are used across tenants. Some machine learning based models are tenant specific. Tenant specific models for achieving the same purpose may be configured differently for different tenants. For example, the number of levels of a neural network may be different for different tenants, the number of outputs of the model may be different for different tenants, and so on. Furthermore, even if models for two tenants are configured the same way, different tenants may train the models using different training datasets. Accordingly, different models are generated for each tenant.

Figure 3:
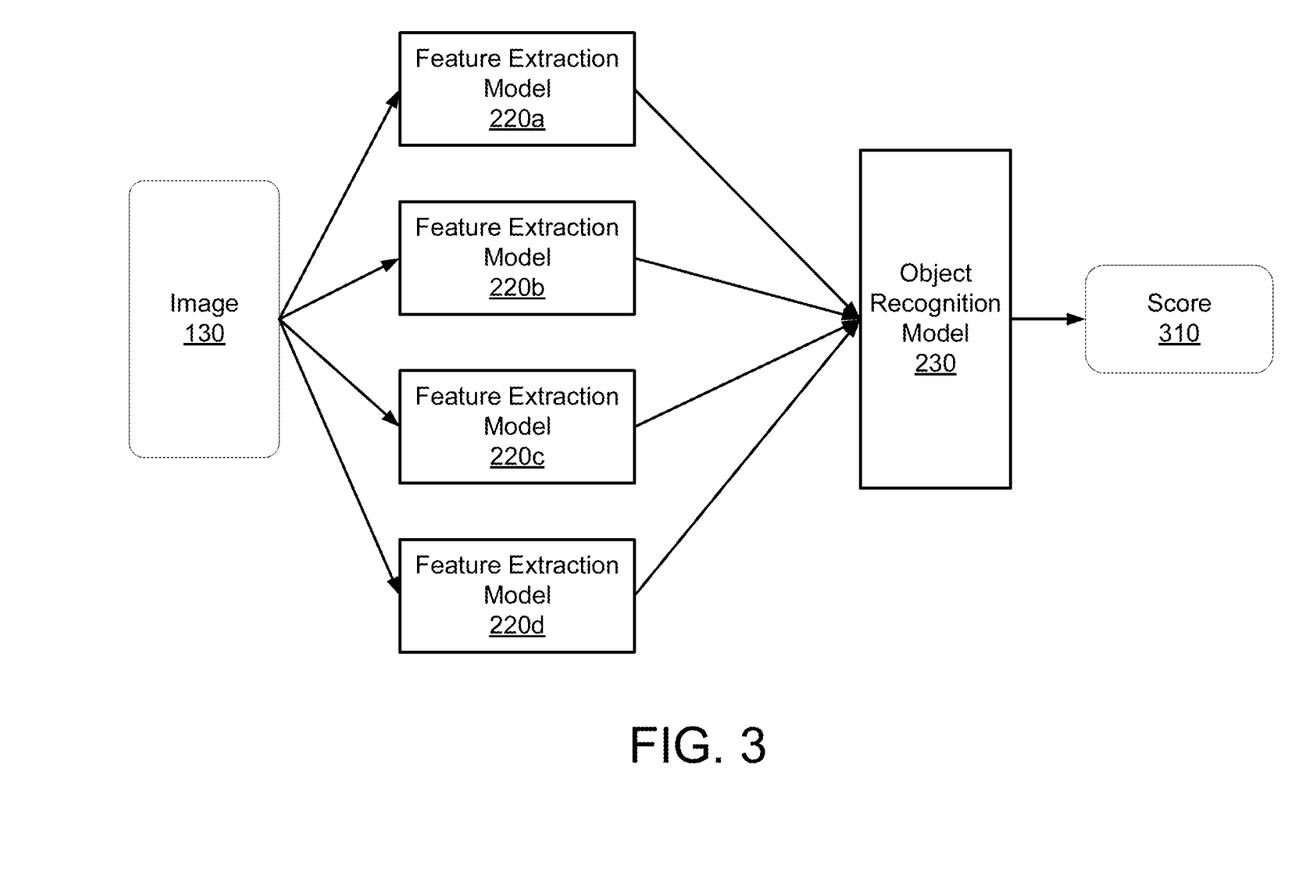
FIG. 3 illustrates the interactions between different components for performing image analysis, according to an embodiment.

FIG. 3 illustrates the interactions between different components for performing image analysis, according to an embodiment. The image 130 is provided as input to multiple feature extraction models 220. Each feature extraction model 220 is trained for extracting a particular feature. Examples of features include placement of an externally visible component of a device, such as a camera of a mobile phone. Other features include screen size of the mobile phone, thickness of the mobile phone, placement of a notch on the mobile phone, placement of a manufacturer name or a logo on a device, and so on.

In an embodiment, the machine learning based models are neural networks that receive an image as input and output a value based on the image, the value representing one of the features described above. In an embodiment, the machine learning based models are convolutional neural networks that receive an image as input and output a value based on the image, the value representing one of the features described above. The models are trained using images of objects with known feature values. For example, various images of phones of known type and screen sizes are provided as training data set to a model trained to predict screen size of a mobile phone, given an image of the mobile phone. Similarly, training datasets are provided for training models for predicting other features of objects based on their images.

The features extracted by the feature extraction model 220 are provided as input to an object recognition model 230. Each of the feature recognition model 220 and the object recognition model 230 may comprise a neural network but are not limited to neural networks. For example, certain feature recognition models may use computer vision techniques for analyzing the image. In an embodiment, the object recognition model 230 includes a rule based system that analyzes the features to determine information describing the object. In this embodiment, an expert may provide the rules to determine the required information based on the features. For example, a user may provide coefficients of mathematical expressions to determine the results based on feature values.

Figure 4:
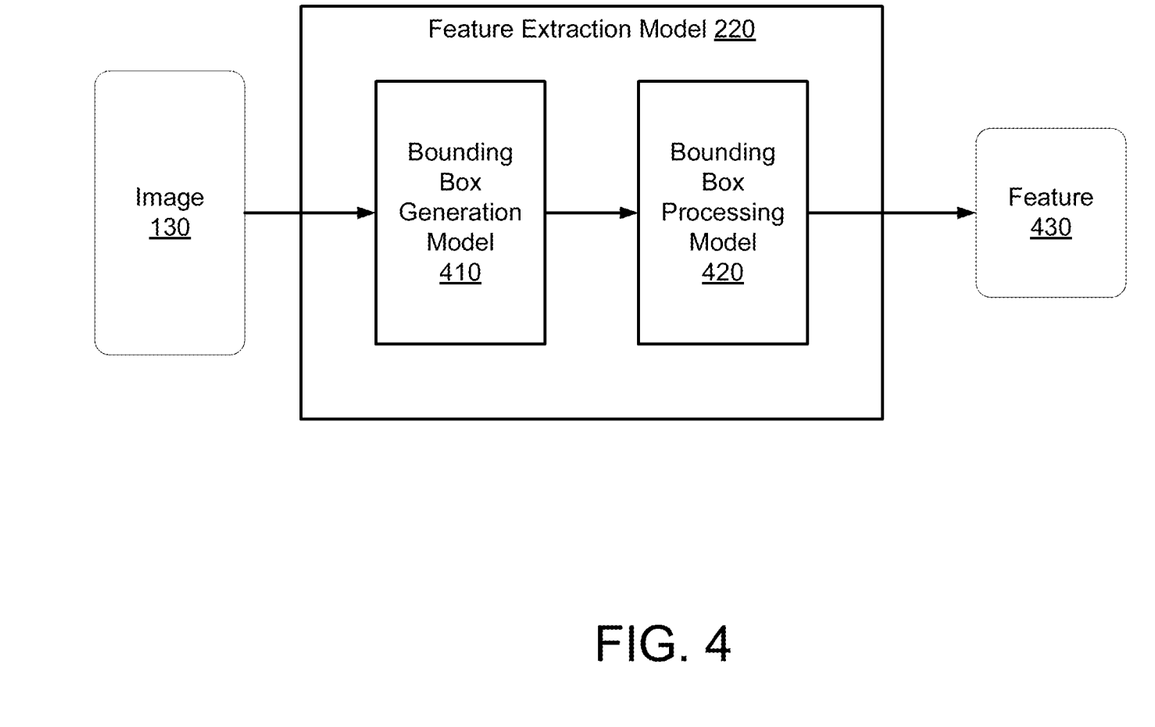
FIG. 4 illustrates the architecture of the feature extraction model, according to an embodiment.

FIG. 4 illustrates the architecture of the feature extraction model, according to an embodiment. In an embodiment, the feature extraction model 220 comprises other models. For example, the feature extraction model 220 may comprise a bounding box generation model 410 and a bounding box processing model 420. The bounding box generation model 410 is trained to determine the coordinates of a bounding box that includes a visible feature or component of an object displayed in the image. The bounding box may display certain text, a logo, a component such as a camera of a phone, or a design feature of the device. The bounding box generation model 410 may generate a representation of a bounding box comprising coordinates of two diagonally separate points of the bounding box. In an embodiment, the bounding box generation model 410 generates a representation of the bounding box comprising one of the points, for example, the lower left corner of the bounding box and a size of a diagonal of the bounding box.

The bounding box processing model 420 processes the image within the bounding box to determine a feature of the object in the image. For example, if the bounding box encloses a logo on a device, the bounding box processing model 420 performs object recognition to classify the logo. Similarly, if the bounding box determines coordinates of a label, the bounding box processing model 420 performs optical character recognition (OCR) to determine the text of the label. For example, the image may show a set of shelves storing objects and the labels may represent information identifying various objects that are expected to be placed on different portions of the shelf and their prices.

The bounding box generation model 410 may output an array of coordinates of bounding boxes representing labels of the shelves. The bounding box processing model 420 performs OCR of the labels to identify the types of objects that are expected to be placed at various positions on the shelves.

Overall Process

Figure 5:
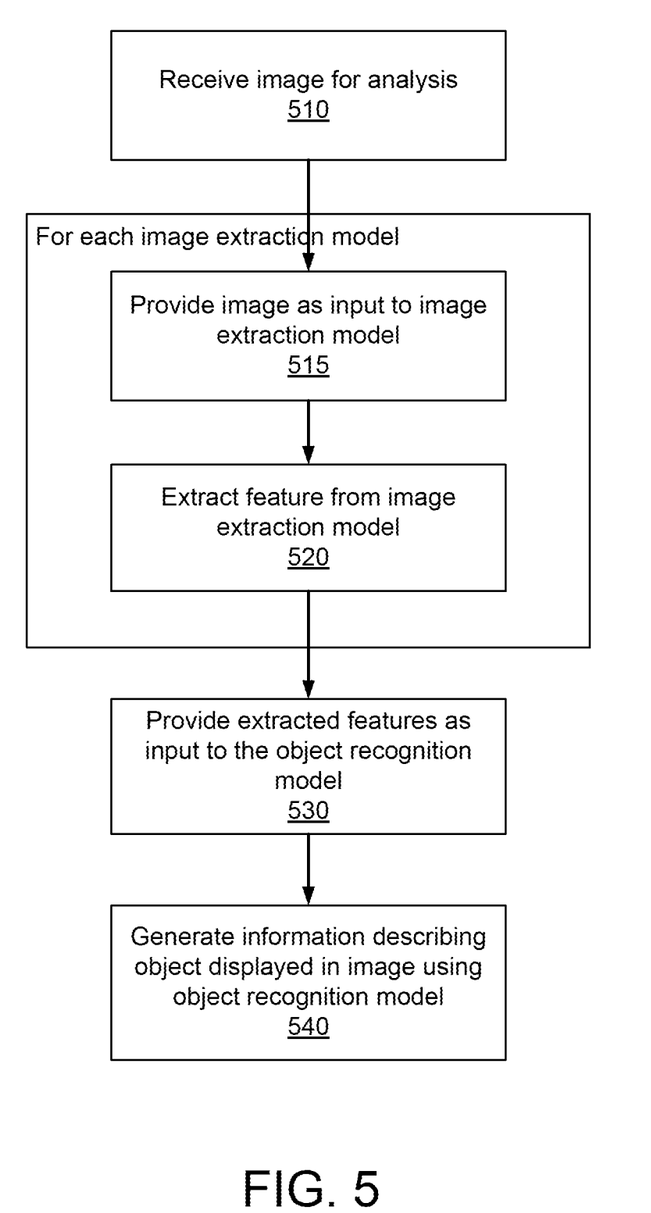
FIG. 5 is the overall process for performing image analysis, according to an embodiment.

FIG. 5 is the overall process for performing image analysis, according to an embodiment. Other embodiments can perform the steps of FIG. 5 in different order than that illustrated in FIG. 5. Other embodiments can include different and/or additional steps than the ones described herein.

The image analysis module 150 receives 510 an image displaying one or more objects for performing analysis. The image analysis model 150 accesses the image extraction models 220. Each image extraction models 220 may comprise a machine learning based model configured to receive an image and predict a feature of an object displayed in the image.

The image analysis model 150 performs steps 515 and 520 for each of the plurality of image extraction models. The image analysis model 150 provides 515 the image as input to the image extraction model and extracts 520 a feature of the image using the output of the image extraction model. The image analysis module 150 provides 530 the extracted features as input to an object recognition model 230 configured to receive the plurality of features as input and predict a property of the objects displayed in the image. The image analysis module 150 generates information describing the objects displayed in the image by executing the object recognition model 230.

Figure 6:
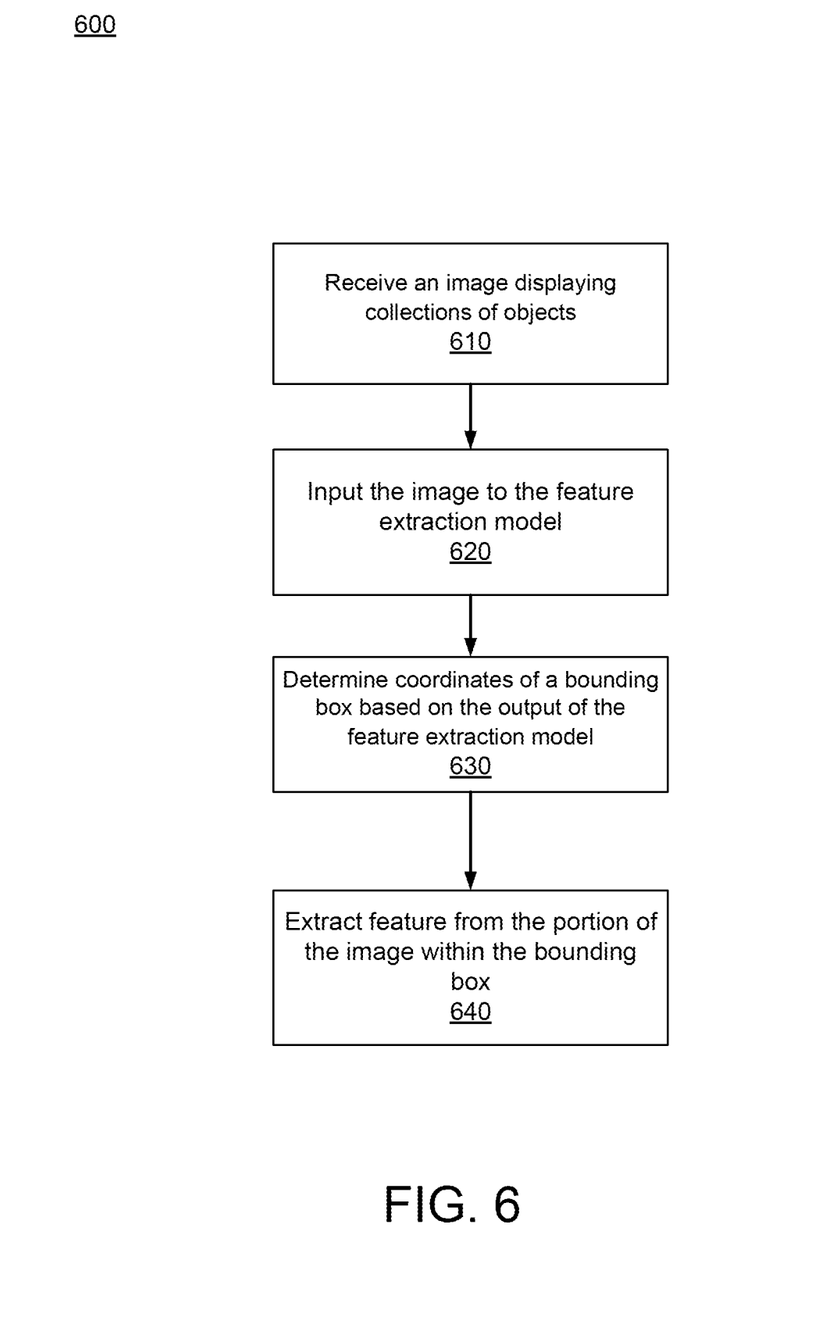
FIG. 6 is the overall process for extracting features of an image, according to another embodiment.

FIG. 6 is the overall process for extracting features of an image, according to another embodiment. Other embodiments can perform the steps of FIG. 5 in different order than that illustrated in FIG. 5. Other embodiments can include different and/or additional steps than the ones described herein.

The image analysis module 150 receives an image displaying collections of objects for processing. The image can be an image of shelves of a physical store or shelves storing packages of different types of products in a warehouse or a store. The image analysis module 150 inputs the image to an image extraction model 220. The image extraction model 220 is executed to determine coordinates of a bounding box displaying a particular feature of an object displayed in the image. The feature may be a product, for example, a device displayed in the image. The feature may be some information displayed as text in a label displayed in the image. For example, a shelf in a store may display various labels identifying products that are expected to be displayed on that portion of the shelf.

The image analysis module 150 extracts a feature based on the portion of image within the bounding box. For example, the bounding box may display a logo and the image analysis module 150 classifies the logo using a classifier model. The bounding box may display certain text and the image analysis module 150 determines the text displayed using optical character recognition (OCR). The image analysis module 150 may further analyze the text displayed, for example, to identify types of entities in the text such as name, date, currency amount, and so on. The image analysis module 150 provides the feature extracted as input to the object recognition model 230. The object recognition model 230 recognizes the object or objects of different types in the image.

The system accesses various policies from the policy store 250 and determines whether any policies are violated by the objects identified in the image. The system retrieves an expression based on feature values from a policy and evaluates the expression to determine whether the constraint specified by the policy is violated. In an embodiment, the policy specifies an expression that needs to be evaluated. The expression evaluates to a value that is either true or false. If the expression evaluates to a true value, the system determines that the constraint is satisfied and the policy is not violated. If the expression evaluates to false, the system determines that the constraint is not satisfied and the policy is violated. If the constraint is violated, the system sends an alert or a report describing the policy violation to a user, for example, a system administrator.

Computer Architecture

Figure 7:
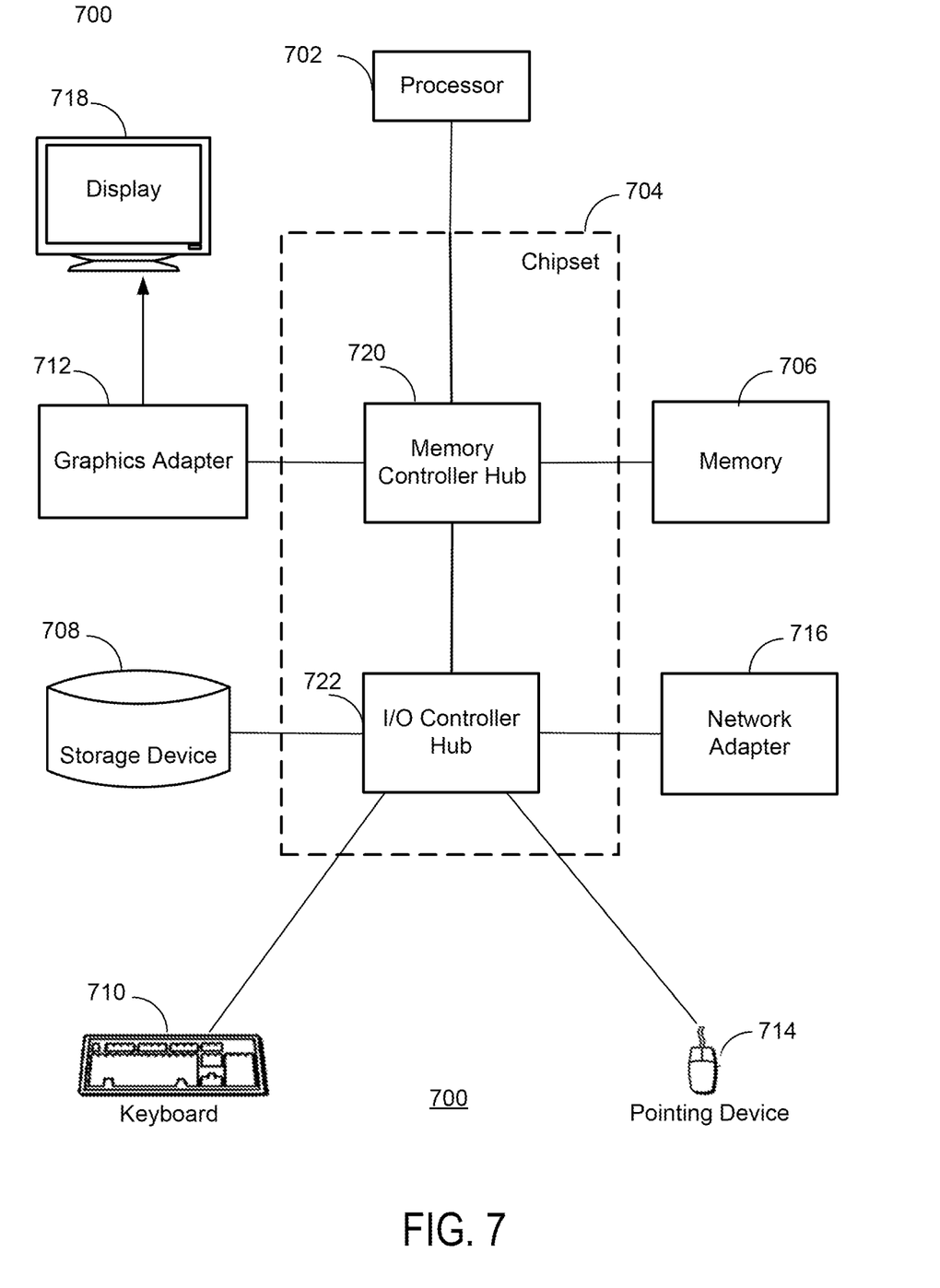
FIG. 7 is a block diagram illustrating a functional view of a typical computer system according to one embodiment.

FIG. 7 is a high-level block diagram illustrating a functional view of a typical computer system for use as one of the entities illustrated in the environment 100 of FIG. 1 according to an embodiment. Illustrated are at least one processor 702 coupled to a chipset 704. Also coupled to the chipset 704 are a memory 706, a storage device 708, a keyboard 710, a graphics adapter 712, a pointing device 714, and a network adapter 716. A display 718 is coupled to the graphics adapter 712. In one embodiment, the functionality of the chipset 704 is provided by a memory controller hub 720 and an I/O controller hub 722. In another embodiment, the memory 706 is coupled directly to the processor 702 instead of the chipset 704.

The storage device 708 is a non-transitory computer-readable storage medium, such as a hard drive, compact disk read-only memory (CD-ROM), DVD, or a solid-state memory device. The memory 706 holds instructions and data used by the processor 702. The pointing device 714 may be a mouse, track ball, or other type of pointing device, and is used in combination with the keyboard 710 to input data into the computer system 700. The graphics adapter 712 displays images and other information on the display 718. The network adapter 716 couples the computer system 700 to a network.

As is known in the art, a computer 700 can have different and/or other components than those shown in FIG. 7. In addition, the computer 700 can lack certain illustrated components. For example, a computer system 700 acting as a multi-tenant system 120 may lack a keyboard 710 and a pointing device 714. Moreover, the storage device 708 can be local and/or remote from the computer 700 (such as embodied within a storage area network (SAN)).

The computer 700 is adapted to execute computer modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 708, loaded into the memory 706, and executed by the processor 702.

The types of computer systems 700 used by the entities of FIG. 1 can vary depending upon the embodiment and the processing power used by the entity. For example, a client device 115 may be a mobile phone with limited processing power, a small display 718, and may lack a pointing device 714. The multi-tenant system 120, in contrast, may comprise multiple blade servers working together to provide the functionality described herein.

Additional Considerations

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

What is claimed is:

1. A computer-implemented method for enforcing policies associated with storing of physical objects, the method comprising:
   receiving an image displaying one or more collections of physical objects stored on one or more shelves, wherein a shelf stores objects of a plurality of object types, wherein a collection stores objects of a particular object type;
   accessing a plurality of machine learning based models, wherein one or more of the plurality of machine learning based models are configured to predict features of the image;
   providing the predicted features as input to an object recognition model, the object recognition model configured to predict a property of the collections of physical objects displayed in the received image;
   determining based on the predicted property, whether a collection of physical objects displayed in the image violates a policy associated with storing the physical objects on shelves; and
   responsive to determining a violation of the policy, sending an alert describing the violation of the policy.

2. The computer-implemented method of claim 1, further comprising, generating a report describing the violation of the policy.

3. The computer-implemented method of claim 1, wherein the policy represents a constraint based on a property of the collection of physical objects.

4. The computer-implemented method of claim 1, wherein the policy specifies relative positions of different types of objects on the one or more shelves.

5. The computer-implemented method of claim 1, wherein the policy specifies a height above ground at which objects of a particular type are placed on the one or more shelves.

6. The computer-implemented method of claim 1, wherein the policy specifies a number of objects of a particular type that should be available on the one or more shelves.

7. The computer-implemented method of claim 1, wherein the policy specifies an order in which objects of a particular type should be placed on the one or more shelves.

8. The computer-implemented method of claim 1, wherein the policy is specified as a constraint represented as an expression and determining whether the collection of physical objects displayed in the image violates a policy comprises evaluating the expression.

9. The computer-implemented method of claim 1, further comprising:
   executing a machine learning based model to determine a bounding box within the image; and
   extracting a feature based on a portion of the image within the bounding box.

10. A non-transitory computer readable storage medium, storing instructions that when executed by one or more computer processors, cause the one or more computer processors to perform steps comprising:
    receiving an image displaying one or more collections of physical objects stored on one or more shelves, wherein a shelf stores objects of a plurality of object types, wherein a collection stores objects of a particular object type;

accessing a plurality of machine learning based models, wherein one or more of the plurality of machine learning based models are configured to predict a features of the image;

providing the predicted features as input to an object recognition model, the object recognition model configured to predict a property of the collections of physical objects displayed in the received image;

determining based on the predicted property, whether a collection of physical objects displayed in the image violates a policy associated with storing the physical objects on shelves; and responsive to determining a violation of the policy, sending an alert describing the violation of the policy.

11. The non-transitory computer readable storage medium of claim 10, further comprising, generating a report describing the violation of the policy.

12. The non-transitory computer readable storage medium of claim 10, wherein the policy represents a constraint based on the property of the collection of physical objects.

13. The non-transitory computer readable storage medium of claim 10, wherein the policy specifies relative positions of different types of objects on the one or more shelves.

14. The non-transitory computer readable storage medium of claim 10, wherein the policy specifies a height above ground at which objects of a particular type are placed on the one or more shelves.

15. The non-transitory computer readable storage medium of claim 10, wherein the policy specifies a number of objects of a particular type that should be available on the one or more shelves.

16. The non-transitory computer readable storage medium of claim 10, wherein the policy specifies an order in which objects of a particular type should be placed on the one or more shelves.

17. The non-transitory computer readable storage medium of claim 10, wherein the policy is specified as a constraint represented as an expression and determining whether the collection of physical objects displayed in the image violates a policy comprises evaluating the expression.

18. The non-transitory computer readable storage medium of claim 10, wherein the instructions further cause the one or more computer processors to perform steps comprising:

executing a machine learning based model to determine a bounding box within the image; and extracting a feature based on a portion of the image within the bounding box.

19. A computer system comprising:

one or more computer processors; and a non-transitory computer readable storage medium, storing instructions that when executed by the one or more computer processors, cause the one or more computer processors to perform steps comprising:

receiving an image displaying one or more collections of physical objects stored on one or more shelves, wherein a shelf stores objects of a plurality of object types, wherein a collection stores objects of a particular object type;

accessing a plurality of machine learning based models, wherein one or more of the plurality of machine learning based models are configured to predict a features of the image;

providing the predicted features as input to an object recognition model, the object recognition model configured to predict a property of the collections of physical objects displayed in the received image;

determining based on the predicted property, whether a collection of physical objects displayed in the image violates a policy associated with storing the physical objects on shelves; and responsive to determining a violation of the policy, sending an alert describing the violation of the policy.

20. The computer system of claim 19, wherein the instructions further cause the one or more computer processors to perform steps comprising:

executing a machine learning based model to determine a bounding box within the image; and extracting a feature based on a portion of the image within the bounding box.

* * * * *